United States Patent [19]

Hirano

[11] Patent Number: 5,740,472

[45] Date of Patent: Apr. 14, 1998

[54] VIBRATION REDUCTION DEVICE

[75] Inventor: Shinichi Hirano, Utsunomiya, Japan

[73] Assignee: Nikon Corporation, Tokyo, Japan

[21] Appl. No.: 713,533

[22] Filed: Sep. 13, 1996

[30] Foreign Application Priority Data

Sep. 14, 1995 [JP] Japan .................................. 7-236972
Sep. 19, 1995 [JP] Japan .................................. 7-236971

[51] Int. Cl.$^6$ ................................................ G03B 17/00
[52] U.S. Cl. .................... 396/55; 396/53; 348/208
[58] Field of Search .................. 396/52, 53, 55; 348/208

[56] References Cited

U.S. PATENT DOCUMENTS

| | | | |
|---|---|---|---|
| 5,084,724 | 1/1992 | Maeno | 396/55 |
| 5,153,633 | 10/1992 | Otani | 396/55 |
| 5,337,098 | 8/1994 | Imafuji et al. | 396/55 |
| 5,402,197 | 3/1995 | Okano et al. | 396/55 |
| 5,463,443 | 10/1995 | Tanaka et al. | 396/55 |
| 5,537,185 | 7/1996 | Ohishi et al. | 396/55 |
| 5,585,875 | 12/1996 | Imafuji et al. | 396/55 |

*Primary Examiner*—Russell E. Adams

[57] ABSTRACT

A vibration reduction device is applied to a system including a body apparatus which has an image taking function and a lens apparatus which is detachably mounted on the body apparatus and includes an image taking optical system. The device has a vibration detector for detecting a vibration generated in the body apparatus or the lens apparatus, an image vibration reduction optical system for reducing an image vibration generated by the vibration, a driving device for moving the image vibration reduction optical system for vibration reduction. The driving device starts image vibration reduction control a predetermined period of time after it receives a signal synchronous with the start of an image taking sequence from the body apparatus. In a device of another mode of this invention, the driving device stops image vibration reduction control after it receives a signal synchronous with completion of an image taking sequence from the body apparatus.

27 Claims, 9 Drawing Sheets

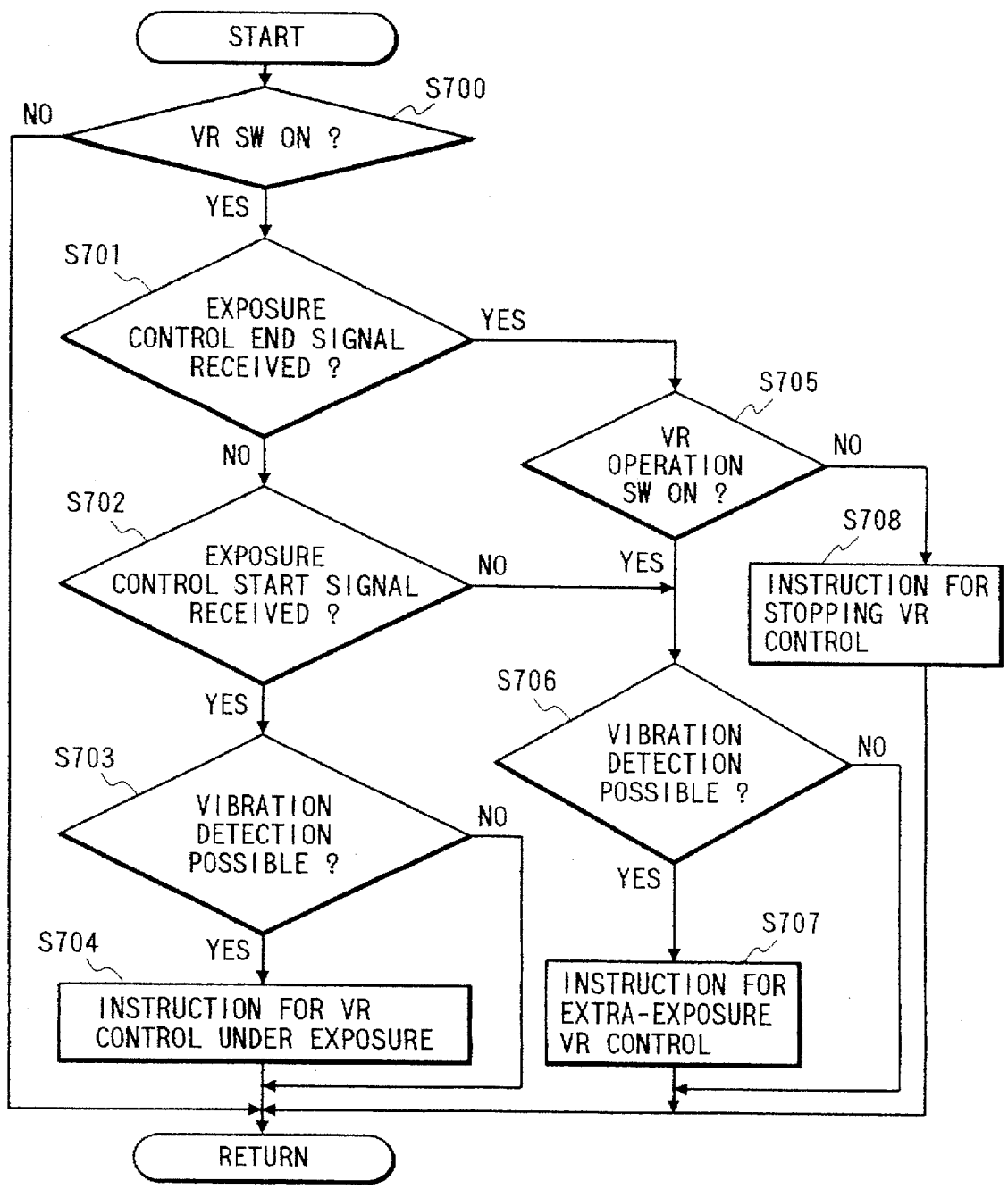

VIBRATION REDUCTION DEVICE

BACKGROUND OF THE INVENTION

1. Field of the Invention

The present invention relates to a vibration reduction device arranged in an image taking apparatus such as a camera.

2. Related Background Art

In a conventional image taking apparatus represented by a camera, an auto-focus device is popular, and recently, it is proposed to add a vibration reduction device that can reduce image vibrations due to camera shake.

In general, when a lens apparatus and a body apparatus in a camera are detachable from each other, a vibration detection sensor for detecting a vibration of a camera, an image vibration reduction optical system for reducing an image vibration generated on the film surface by the vibration of the camera, and a drive control unit of the image vibration reduction optical system may be arranged in the lens apparatus, and film exposure control, film feed control, an image vibration reduction command, auto-focus control, and the like may be attained by the body apparatus.

In such system, the lens apparatus detects the vibration amount generated in the camera system constituted by the body apparatus and the lens apparatus which are connected to each other, and moves the image vibration reduction optical system based on the detected vibration amount to perform the reduction control of an image vibration generated on the film surface. For this reason, in order to attain smooth vibration reduction control in an image taking operation, information must be exchanged between the lens apparatus and the body apparatus that controls the entire system.

When a lens apparatus having an image vibration reduction function is attached to a body apparatus having a control function of the lens apparatus and such system is used, the body apparatus transmits control commands and information required in image vibration reduction control to the lens apparatus, and the lens apparatus interprets the commands to execute control, thereby smoothly executing the vibration reduction control in the entire camera system, and other control operations such as film exposure control and the like.

However, when a lens apparatus having an image vibration reduction function is attached to a body apparatus which was designed without any control command output function for the lens apparatus before development/design of the lens apparatus, and such system is used, since the body apparatus cannot output any image vibration reduction control command, image vibration reduction control cannot be performed.

On the other hand, when the lens apparatus having an image vibration reduction function is attached to the body apparatus which was designed without any control command output function for the lens apparatus before development/design of the lens apparatus, and such system is used, since the body apparatus cannot detect the preparation state of a vibration detection circuit in the lens apparatus, image vibration reduction control may be performed in the vibration detection impossible state. In such a case, the image vibration amount of a picture taken when the image vibration reduction control is performed becomes larger than that of a picture taken when no image vibration reduction control is performed under the same condition contrary to the original purpose.

SUMMARY OF THE INVENTION

The present invention has been made to solve the conventional problems, and has as its object, according to its first aspect, to provide a vibration reduction device which can reliably attain image vibration reduction control even when a lens apparatus having an image vibration reduction function is attached to a body apparatus having no control function for the image vibration reduction function.

A vibration reduction device according to the first aspect of the present invention is applied to a system including a body apparatus having an image taking function and a lens apparatus which is detachably mounted on the body apparatus.

In a vibration reduction device of one mode of the present invention, image vibration reduction driving means starts image vibration reduction control a predetermined period of time after it receives a signal synchronous with the start timing of image taking control from the body apparatus.

The predetermined period of time may be determined based on identification information of the body apparatus, that is transmitted from the body apparatus. In this case, the start timing of vibration reduction control under film exposure can be changed depending on the types of bodies, and the lens apparatus can predict a margin time until the start timing of the vibration reduction control in advance. For this reason, by performing a preliminary driving operation for a large vibration, the control followability can be improved.

Alternatively, the predetermined period of time may be set to be a constant time including zero time.

The predetermined period of time may be set to be equal to the shortest one of mirror-up times of a plurality of body apparatuses to which the lens apparatus can be mounted.

In a vibration reduction device of another mode, the image vibration reduction driving means stops image vibration reduction control after it receives a signal synchronous with the completion of exposure control supplied from the body apparatus.

In a vibration reduction device of still another mode, the image vibration reduction driving means moves an image vibration reduction optical system to an optical central position after it receives a signal synchronous with the completion of exposure control supplied from the body apparatus. In this case, the optical system can be easily and reliably returned to the normal state.

In a vibration reduction device of still another mode, the image vibration reduction driving means starts image vibration reduction control after it receives a signal synchronous with completion of a mirror-up operation supplied from the body apparatus. In this case, the start timing of the vibration reduction control under film exposure can be detected immediately before film exposure independently of the types of bodies, and the start precision of the vibration reduction control can be improved. Also, no table look-up operation for determining the start timing is required.

In a vibration reduction device of still another mode, the image vibration reduction driving means determines the completion timing of exposure control on the basis of an exposure control time, and stops the image vibration reduction control. In this case, since the completion timing of the vibration reduction control under film exposure can be predicted based on the exposure control time, a control method may be changed depending on the relationship between the vibration reduction condition and the remaining control time.

In a vibration reduction device of still another mode, the image vibration reduction driving means determines the completion timing of exposure control on the basis of an exposure control time, and moves the image vibration reduction optical system to the optical central position. In this case, the optical system can be easily and reliably returned to the normal state.

In a vibration reduction device of still another mode, the image vibration reduction driving means changes a control method of the image vibration reduction control after it receives a signal synchronous with the completion timing of exposure control supplied from the body apparatus.

In a vibration reduction device of still another mode, the image vibration reduction driving means determines the completion timing of exposure control on the basis of an exposure control time, and changes a control method of the image vibration reduction control.

In a vibration reduction device of still another mode, the image vibration reduction driving means changes a control method of the image vibration reduction control a predetermined period of time after it receives a signal synchronous with the start timing of image taking control supplied from the body apparatus. The predetermined period of time may be determined based on identification information of the body apparatus, that is supplied from the body apparatus. In this case, the vibration reduction control method under film exposure can be changed depending on the type of bodies. The predetermined period of time may be set to be a constant time including zero time. The predetermined period of time may be set to be equal to the shortest one of mirror-up times of a plurality of body apparatuses to which the lens apparatus can be mounted.

In a vibration reduction device of still another mode, the image vibration reduction driving means changes a control method of the image vibration reduction control after it receives a signal synchronous with completion of a mirror-up operation, that is supplied from the body apparatus.

The present invention has been made to solve the conventional problems described earlier, and has as its object, according to its second aspect, to provide a vibration reduction device which can easily and reliably attain image vibration reduction control in the vibration detection impossible state.

A vibration reduction device according to the second aspect of the present invention is applied to a system including a body apparatus having an image taking function and a lens apparatus which is detachably mounted on the body apparatus.

A vibration reduction device of one mode of the present invention comprises transmission means for transmitting information indicating that a vibration detection means is in the vibration detection possible state from a lens apparatus to a body apparatus, output means, arranged in the body apparatus, for outputting vibration reduction start information as information for determining the start timing of a driving operation of image vibration reduction driving means to the lens apparatus, and inhibition means, arranged in the body apparatus, for, when an image taking start command is input while the vibration detection means is not in the vibration detection possible state, inhibiting the vibration reduction start information from being transmitted to the lens apparatus or suspending transmission until the vibration detection means is set in the vibration detection possible state.

The vibration reduction start information may be a signal synchronous with an image taking start operation of a photographer, a signal synchronous with completion of a mirror-up operation of the body apparatus, or a vibration reduction start command used only for starting the driving operation of the image vibration reduction driving means.

A vibration reduction device of another mode comprises output means, arranged in the body apparatus, for outputting vibration reduction start information as information for determining the start timing of a driving operation of image vibration reduction driving means to the lens apparatus, and inhibition means, arranged in the lens apparatus, for, when the vibration reduction start information is input from the output means while the vibration detection means is not in the vibration detection possible state, inhibiting execution of the driving operation of the image vibration reduction driving means, or suspending execution of the driving operation of the driving operation until the vibration detection means is set in the vibration detection possible state.

The vibration reduction start information may be a signal synchronous with an image taking start operation of a photographer, a signal synchronous with completion of a mirror-up operation of the body apparatus, or a vibration reduction start command used only for starting the driving operation of the image vibration reduction driving means.

A vibration reduction device of still another mode comprises output means for outputting vibration reduction start information as information for determining the start timing of a driving operation of image vibration reduction driving means to the lens apparatus, and inhibition means, arranged in the body apparatus, for, when an image taking start command is input within a predetermined period of time after a power supply signal is supplied from the body apparatus to the lens apparatus, inhibiting transmission of the vibration reduction start information to the lens apparatus or suspending transmission until an elapse of the predetermined period of time.

The predetermined period of time may be set to be equal to a maximum time required until the vibration detection means is set in the vibration detection possible state, after the power supply is turned on. The vibration reduction start information may be a signal synchronous with an image taking start operation of a photographer, a signal synchronous with completion of a mirror-up operation of the body apparatus, or a vibration reduction start command used only for starting the driving operation of the image vibration reduction driving means.

BRIEF DESCRIPTION OF THE DRAWINGS

FIG. 7 is a flow chart for explaining the subroutine of step S206 according to the fourth embodiment of a vibration reduction device of the present invention.

DETAILED DESCRIPTION OF THE PREFERRED EMBODIMENTS

The preferred embodiments of the present invention will be described in detail hereinafter.

First, embodiments according to the first aspect of the present invention will be described below with reference to FIGS. 1 to 6.

Figure 1:
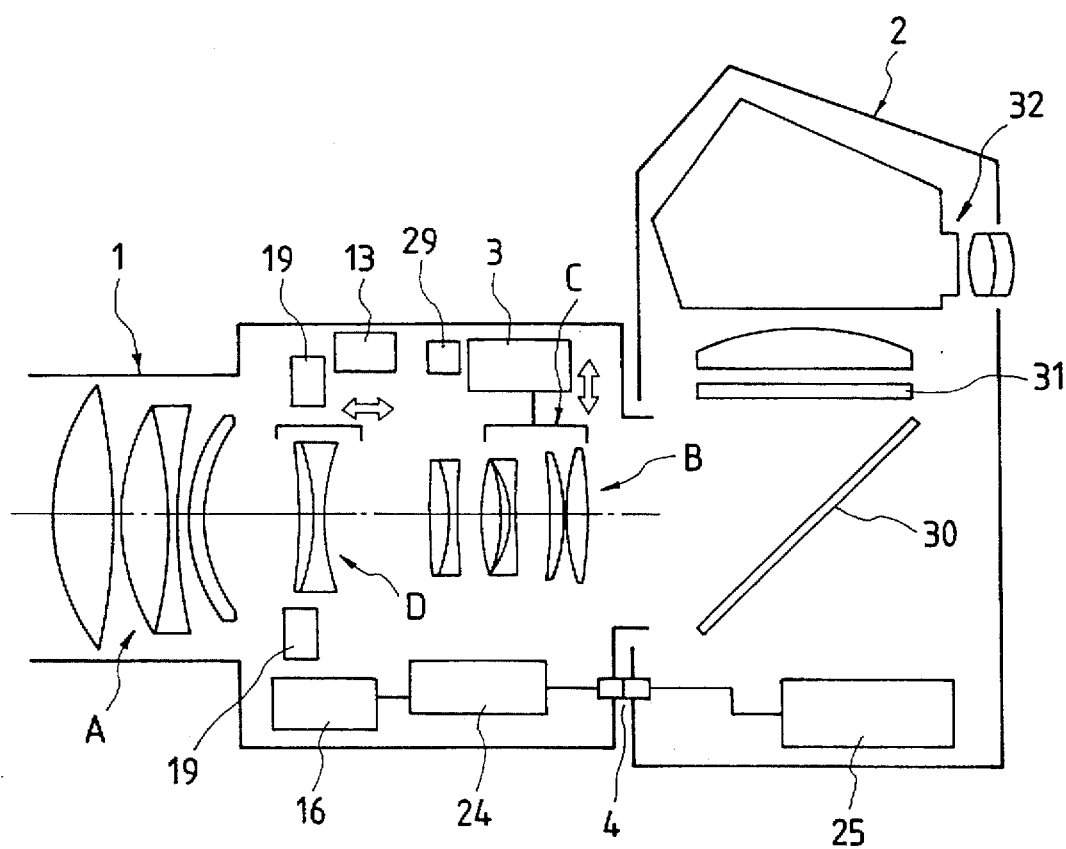
FIG. 1 is a sectional view showing the arrangement of an embodiment of a vibration reduction device according to the present invention.
Figure 2:
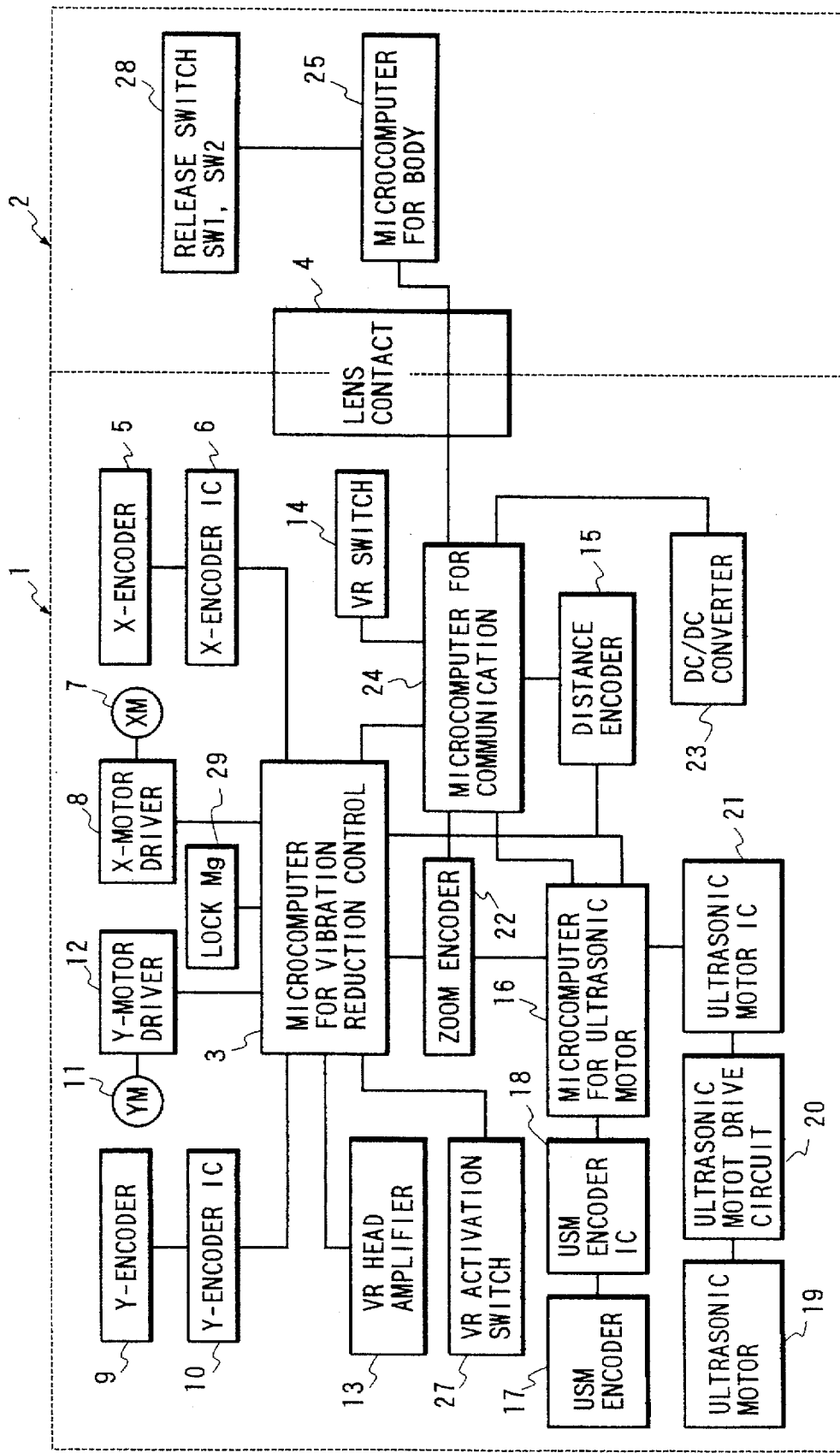
FIG. 2 is a block diagram showing the arrangement of the embodiment shown in FIG. 1.

FIG. 1 is a sectional view showing the arrangement of an embodiment in which a vibration reduction device according to the present invention is applied to a single-lens reflex camera, and FIG. 2 is a block diagram showing the signal system of the vibration reduction device according to this embodiment.

In this embodiment, the vibration reduction device is assembled in a single-lens reflex camera constituted by a lens apparatus 1 and a body apparatus 2.

An image taking optical system A, an image vibration reduction optical system B, a vibration reduction head amplifier 13, an ultrasonic motor 19, and the like are arranged in the lens apparatus 1. Also, a microcomputer 3 for vibration reduction control, a microcomputer 16 for an ultrasonic motor, a microcomputer 24 for a communication, and the like are arranged in the lens apparatus 1.

A mirror 30, a focusing screen 31, a finder 32, and the like are arranged in the body apparatus 2. Also, a microcomputer 25 for a body, and the like are arranged in the body apparatus 2.

The microcomputer 3 for vibration reduction control controls the driving operation of a vibration reduction driving unit C on the basis of the output from the microcomputer 25 for a body in the body apparatus 2 and optical system position information output from encoders 5, 9, 15, 22, and the like. The vibration reduction driving unit C comprises an X-axis driving motor 7, an X-axis motor driver 8, a Y-axis driving motor 11, a Y-axis motor driver 12, and the like.

A lens contact 4 arranged at the mounting portion of the lens apparatus 1 to the body apparatus 2 includes electrical contacts used for exchanging signals with the body apparatus 2, and is connected to the microcomputer 24 for a communication.

The X-encoder 5 detects the moving amount of the optical system in the X-axis direction, and its output is connected to an X-encoder IC 6. The X-encoder IC 6 converts the moving amount of the optical system in the X-axis direction into an electrical signal, which is supplied to the microcomputer 3 for vibration reduction control. The X-axis driving motor 7 is a driving motor for moving an X-axis vibration reduction optical system. The X-axis motor driver 8 is a circuit for driving the X-axis driving motor 7.

Similarly, the Y-encoder 9 detects the moving amount of the optical system in the Y-axis direction, and its output is connected to a Y-encoder IC 10. The Y-encoder IC 10 converts the moving amount of the optical system in the Y-axis direction into an electrical signal, which is supplied to the microcomputer 3 for vibration reduction control. The Y-axis driving motor 11 is a driving motor for moving a Y-axis vibration reduction optical system. The Y-axis motor driver 12 is a circuit for driving the Y-axis driving motor 11.

The vibration reduction head amplifier 13 is a circuit for detecting the vibration amount. The amplifier 13 converts image vibration information into an electrical signal, and supplies the signal to the microcomputer 3 for vibration reduction control. The vibration reduction head amplifier 13 may comprise, e.g., an angle sensor.

A VR switch 14 is a switch for turning on/off a vibration reduction driving mode.

The distance encoder 15 is an encoder for detecting the focus position, and converting the detected position into an electrical signal. The output from the encoder 15 is supplied to the microcomputer 3 for vibration reduction control, the microcomputer 16 for an ultrasonic motor, and the microcomputer 24 for communication.

The microcomputer 16 for an ultrasonic motor controls the ultrasonic motor 19 that drives a focusing optical system D.

A USM encoder 17 is an encoder for detecting the moving amount of the ultrasonic motor 19, and its output is connected to a USM encoder IC 18. The USM encoder IC 18 is a circuit for converting the moving amount of the ultrasonic motor 19 into an electrical signal, which is supplied to the microcomputer 16 for an ultrasonic motor.

The ultrasonic motor 19 is a motor for driving the focusing optical system D. An ultrasonic motor drive circuit 20 is a circuit for generating two driving signals which have a driving frequency inherent to the ultrasonic motor 19 and have a 90° phase difference therebetween. An ultrasonic motor IC 21 is a circuit for interfacing between the microcomputer 16 for an ultrasonic motor and the ultrasonic motor drive circuit 20.

The zoom encoder 22 is an encoder for detecting the lens focal length position, and converting it into an electrical signal, and is connected to the microcomputer 3 for vibration reduction control, the microcomputer 16 for an ultrasonic motor, and the microcomputer 24 for communication.

A DC—DC converter 23 is a circuit for supplying a stable DC voltage with respect to a variation in battery voltage, and is controlled by a signal supplied from the microcomputer 24 for communication.

The microcomputer 24 for communication makes communications between the lens apparatus 1 and the body apparatus 2 to supply commands to other microcomputers 3 and 16, and the like in the lens apparatus 1.

A release switch 28 is arranged in the body apparatus 2, and is constituted by a half-stroke switch SW1 which starts an image taking preparation operation when the release button is depressed to its half-stroke position, and a full-stroke switch SW2 which starts exposure control when the release button is depressed to its full-stroke position.

A lock magnet 29 serving as a lock mechanism is an electromagnetic magnet, which is arranged in the lens apparatus 1 and is interlocked with a mechanism member (not shown) arranged for locking a vibration reduction mechanism.

When the lock magnet 29 is energized, the vibration reduction mechanism is movable, and when the lock magnet 29 is not energized, the vibration reduction mechanism is locked.

More specifically, the lock magnet 29 serves as a lock mechanism having an energization type unlocking function for "unlocking the vibration reduction mechanism from a predetermined stop position (central position)" when it is energized.

The mirror 30 is arranged in the body apparatus 2. When a photographer turns on the release switch 28 to input an image taking start command, the mirror 30 moves so that light transmitted through the lens reaches the film surface.

Upon completion of film exposure, the mirror 30 returns to the original position to allow the photographer to observe light transmitted through the lens via the finder 32.

Figure 3:
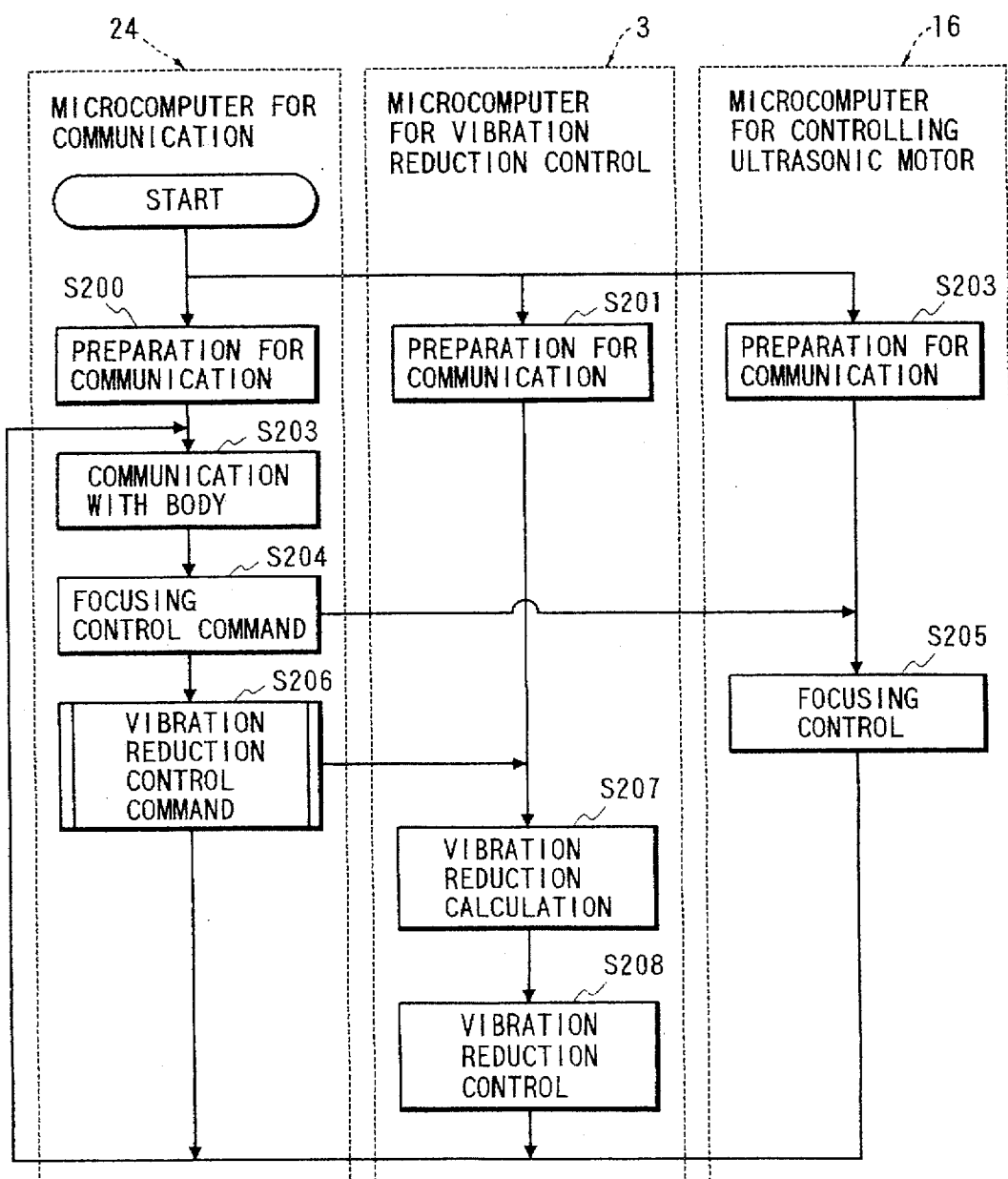
FIG. 3 is a flow chart for explaining the operation order of the vibration reduction device shown in FIG. 1.

FIG. 3 is a flow chart for explaining the operation order of the vibration reduction device arranged in the above-mentioned camera.

First, the microcomputer 24 for a communication performs preparation for a communication (S200).

At the same time, the microcomputer 3 for vibration reduction control performs preparation for a communication (S201). Also, the microcomputer 16 for an ultrasonic motor performs preparation for a communication (S202).

Subsequently, the microcomputer 24 for a communication communicates with the microcomputer 25 for a body in the body apparatus 2 via the lens contact 4 (S203).

The microcomputer 24 transfers a focusing control command supplied from the microcomputer 25 for a body to the microcomputer 16 for an ultrasonic motor (S204).

In response to this command, the microcomputer 16 for an ultrasonic motor performs focusing control on the basis of information supplied from the zoom encoder 22 and the distance encoder 15 (S205).

The microcomputer 24 for communication transfers a vibration reduction control command to the microcomputer 3 for vibration reduction control (S206).

In response to this command, the microcomputer 3 for vibration reduction control performs a vibration reduction calculation (S207).

The microcomputer 3 for vibration reduction control then performs vibration reduction control or lock-associated control (lock control or unlock control) (S208).

Figure 4:
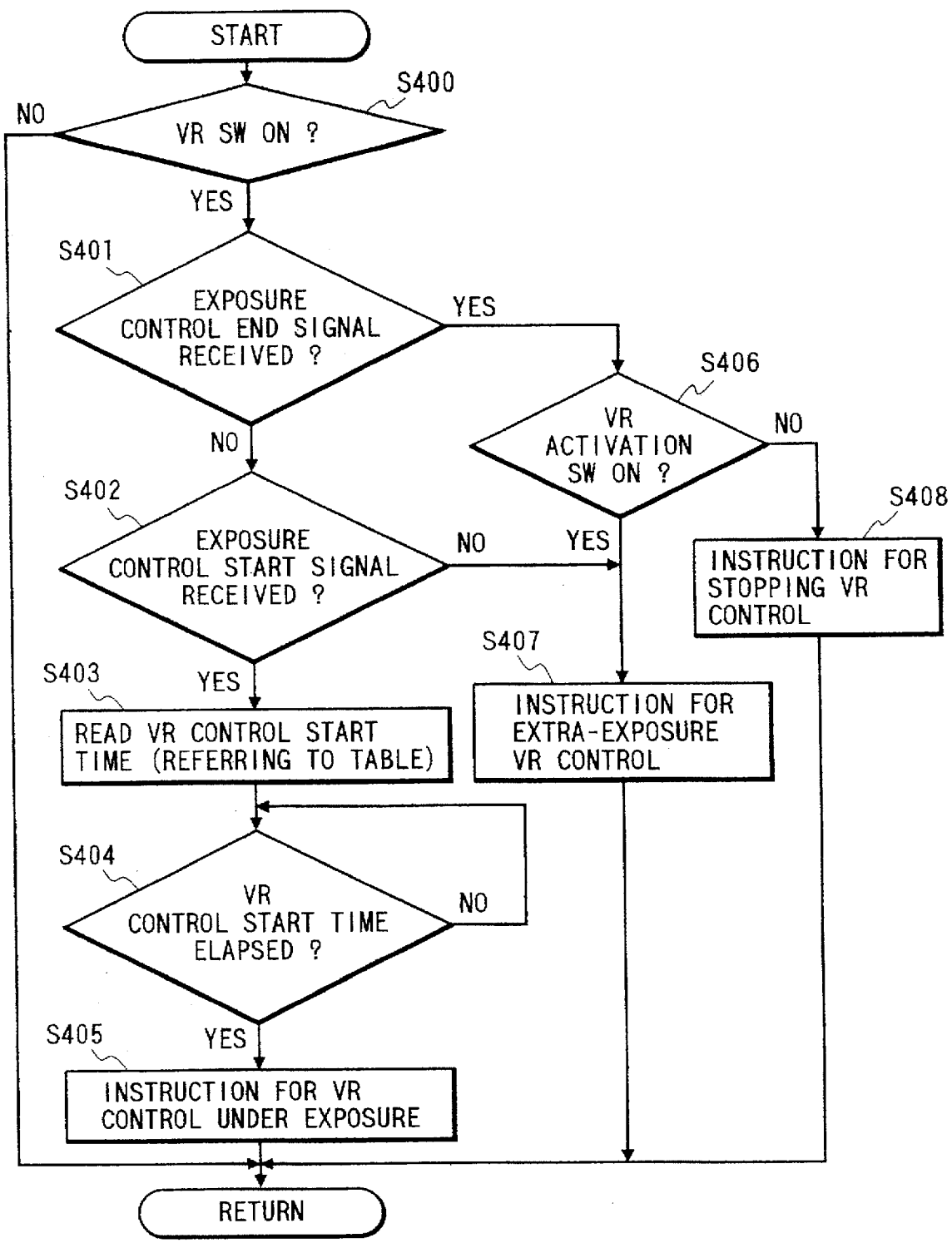
FIG. 4 is a flow chart for explaining the subroutine of step S206 in FIG. 3.

FIG. 4 is a flow chart for explaining the first embodiment of the operation order of the subroutine executed in step S206 shown in FIG. 3.

In the first embodiment, the execution timing of the vibration reduction control is determined on the basis of an exposure control start signal, an exposure control completion signal, and body identification information as signals transmitted from the microcomputer 25 for a body in the body apparatus 2.

The lens apparatus 1 checks the ON/OFF state of the VR switch 14 to determine if the vibration reduction control mode is ON (S400).

If the VR switch 14 is ON (vibration reduction control execution mode), the flow advances to step S401; otherwise (vibration reduction control non-execution mode), the flow returns to the main routine.

In this case, Table 1 below summarizes the relationship between the state of the VR switch 14 and the control operation.

TABLE 1

| VR Switch | ON | OFF |
|---|---|---|
| Control Operation | Vibration Reduction Control Execution Mode (Vibration Reduction Control Under Film Exposure, or By VR Activation Switch During Operation Other Than Film Exposure) | Vibration Reduction Control Non-execution Mode |

Subsequently, the microcomputer 24 for communication in the lens apparatus 1 checks if an exposure control completion signal is received from the microcomputer 25 for a body in the body apparatus 2 (S401).

If an exposure control completion signal is received, the flow advances to step S406; otherwise, the flow advances to step S402.

The microcomputer 24 for communication in the lens apparatus 1 checks if an exposure control start signal is received from the microcomputer 25 for a body in the body apparatus 2 (S402).

If an exposure control start signal is received, the flow advances to step S403; otherwise, the flow advances to step S407.

Table 2 below summarizes information associated with the transmission timings of signals from the microcomputer 25 for a body in the body apparatus 2 to the microcomputer 24 for a communication in the lens apparatus 1.

TABLE 2

| Transmitted Information | Meaning |
|---|---|
| Exposure Control Start Signal | Signal synchronous with change in state of release switch operated by photographer at the beginning of film exposure. |
| Body Identification Information | Information used for identifying body attached to lens apparatus. |
| Exposure Control Completion Signal | Signal synchronous with completion of exposure control in body. |
| Exposure Control Time (Shutter Speed) | Information about exposure time of film. |
| Mirror-up Completion Signal | Signal that changes upon completion of mirror-up operation. The same state as that immediately before exposure control. |

Subsequently, the microcomputer 24 for communication in the lens apparatus 1 reads out vibration reduction control start time information indicating the wait time until it issues an instruction for vibration reduction control under exposure to the microcomputer 3 for vibration reduction control (S403).

The vibration reduction control start time corresponds to a time required for the mirror-up operation in the camera body, and varies depending on the type of body apparatus 2.

Values corresponding to identification information which is transmitted from the microcomputer 25 for a body in the body apparatus 2 and identifies the body apparatus 2 is stored as a table in a memory area of the microcomputer 24 for a communication in the lens apparatus 1 in advance.

Table 3 below shows an example of the table that stores the vibration reduction start times in correspondence with the body types.

TABLE 3

| Body Type | Vibration Reduction Control Start Time |
| --- | --- |
| F4 | 45 [ms] |
| F90 | 45 [ms] |
| F70 | 50 [ms] |
| F50 | 55 [ms] |
| F601 | 65 [ms] |

The microcomputer 24 for a communication in the lens apparatus 1 checks if the vibration reduction control start time that varies depending on the body type has elapsed from reception of the exposure control start signal (S404).

If the vibration reduction control start time has elapsed, the flow advances to step S405; otherwise, step S404 is executed.

When the vibration reduction control start time has elapsed, the microcomputer 24 for communication in the lens apparatus 1 issues an instruction for vibration reduction control under exposure to the microcomputer 3 for vibration reduction control (S405).

The instruction for vibration reduction control under exposure instructs a control method for performing precise control upon reduction of vibrations under actual exposure.

On the other hand, if the microcomputer 24 for a communication in the lens apparatus 1 receives an exposure control completion signal in step S401, the flow advances to step S406.

It is checked if a VR activation switch 27 is ON (S406).

If the VR activation switch 27 is ON, the flow advances to step S407; otherwise, the flow advances to step S408.

Table 4 below summarizes the relationship between the state of the VR activation switch 27 and the control operation.

TABLE 4

| VR Activation Switch | ON | OFF |
| --- | --- | --- |
| Control Operation | Vibration Reduction Control Execution Mode | Vibration Reduction Control Non-execution Mode |

In step S407, the microcomputer 24 for a communication in the lens apparatus 1 issues an instruction for "extra-exposure vibration reduction control as a control method different from vibration reduction control under exposure" to the microcomputer 3 for vibration reduction control.

The instruction for extra-exposure vibration reduction control instructs a mode of performing coarse control when vibrations of a finder image are to be reduced after an image taking preparation start operation.

On the other hand, when the VR activation switch 27 is OFF, the microcomputer 24 for a communication in the lens apparatus 1 issues an instruction for stopping vibration reduction control to the microcomputer 3 for vibration reduction control (S408).

In the vibration reduction device of the first embodiment described above, since the execution timing of the vibration reduction control is determined on the basis of the exposure control start signal, the exposure control completion signal, and the body identification information transmitted from the microcomputer 25 for a body in the body apparatus 2, even when the lens apparatus 1 having the image vibration reduction function is attached to the body apparatus 2 having no control function for the image vibration reduction function, the image vibration reduction control can be reliably performed.

Also, since the start timing of the vibration reduction control under film exposure can be changed depending on the body type of the body apparatus 2, and the lens apparatus 1 can predict the margin time until the start of the vibration reduction control in advance, the control followability can be improved by performing a preliminary driving operation for a large vibration in advance.

Figure 5:
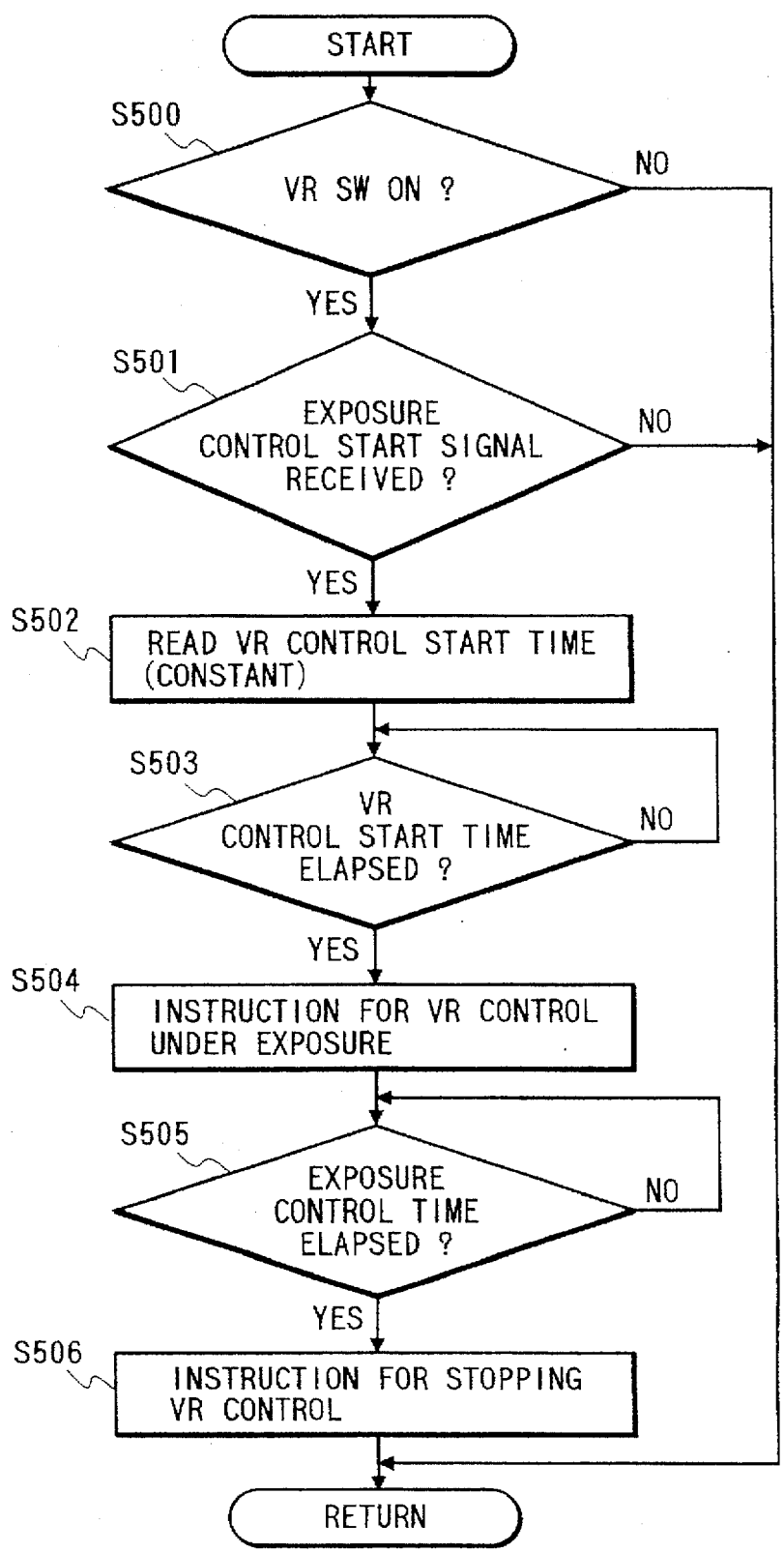
FIG. 5 is a flow chart for explaining the subroutine of step S206 according to the second embodiment of a vibration reduction device of the present invention.

FIG. 5 is a flow chart for explaining the second embodiment of the operation order of the subroutine executed in step S206 shown in FIG. 3.

In the second embodiment, the execution timing of vibration reduction control is determined on the basis of an exposure control start signal and an exposure control time transmitted from the microcomputer 25 for a body in the body apparatus 2, and the vibration reduction control is executed only under film exposure.

First, the microcomputer 24 for a communication in the lens apparatus 1 checks the ON/OFF state of the VR switch 14 to determine if the vibration reduction control mode is ON (S500).

If the VR switch 14 is ON (vibration reduction control execution mode), the flow advances to step S501; otherwise (vibration reduction control non-execution mode), the flow returns to the main routine.

Subsequently, the microcomputer 24 for communication in the lens apparatus 1 checks if an exposure control completion signal is received from the microcomputer 25 for a body in the body apparatus 2 (S501).

If an exposure control completion signal is received, the flow advances to step S502; otherwise, the flow returns to the main routine.

In step S502, the microcomputer 24 for a communication in the lens apparatus 1 reads out vibration reduction control start time information indicating the wait time until it issues an instruction for vibration reduction control under exposure to the microcomputer 3 for vibration reduction control.

The vibration reduction control start time corresponds to the shortest mirror-up time of those of body types of every body apparatuses 2 to which the lens apparatus 1 may be attached, and is stored in advance in a memory area of the microcomputer 24 for a communication in the lens apparatus 1.

The microcomputer 24 for communication in the lens apparatus 1 checks if the vibration reduction control start time has elapsed from reception of the exposure control start signal (S503).

If the vibration reduction control start time has elapsed, the flow advances to step S503; otherwise, step S503 is executed again.

In step S504, the microcomputer 24 for instruction for vibration reduction control under exposure to the microcomputer 3 for vibration reduction control (S504).

Subsequently, the microcomputer 24 for communication in the lens apparatus 1 checks if an exposure control time (shutter speed) input from the microcomputer 25 for a body in the body apparatus 2 has elapsed from the instruction for vibration reduction control under exposure (S505).

If the exposure control time has elapsed, the flow advances to step S506; otherwise, step S505 is executed again.

In step S506, the microcomputer 24 for a communication in the lens apparatus 1 issues an instruction for stopping vibration reduction control to the microcomputer 3 for vibration reduction control.

In the vibration reduction device of the second embodiment described above, since the execution timing of the vibration reduction control is determined on the basis of the exposure control start signal and the exposure control time transmitted from the microcomputer 25 for a body in the body apparatus 2, even when the lens apparatus 1 having the image vibration reduction function is attached to the body apparatus 2 having no control function for the image vibration reduction function, the image vibration reduction control can be reliably performed.

Since the completion timing of the vibration reduction control under film exposure can be predicted on the basis of the exposure control time, the control method can be appropriately changed on the basis of the relationship between the vibration reduction condition and the remaining control time.

Figure 6:
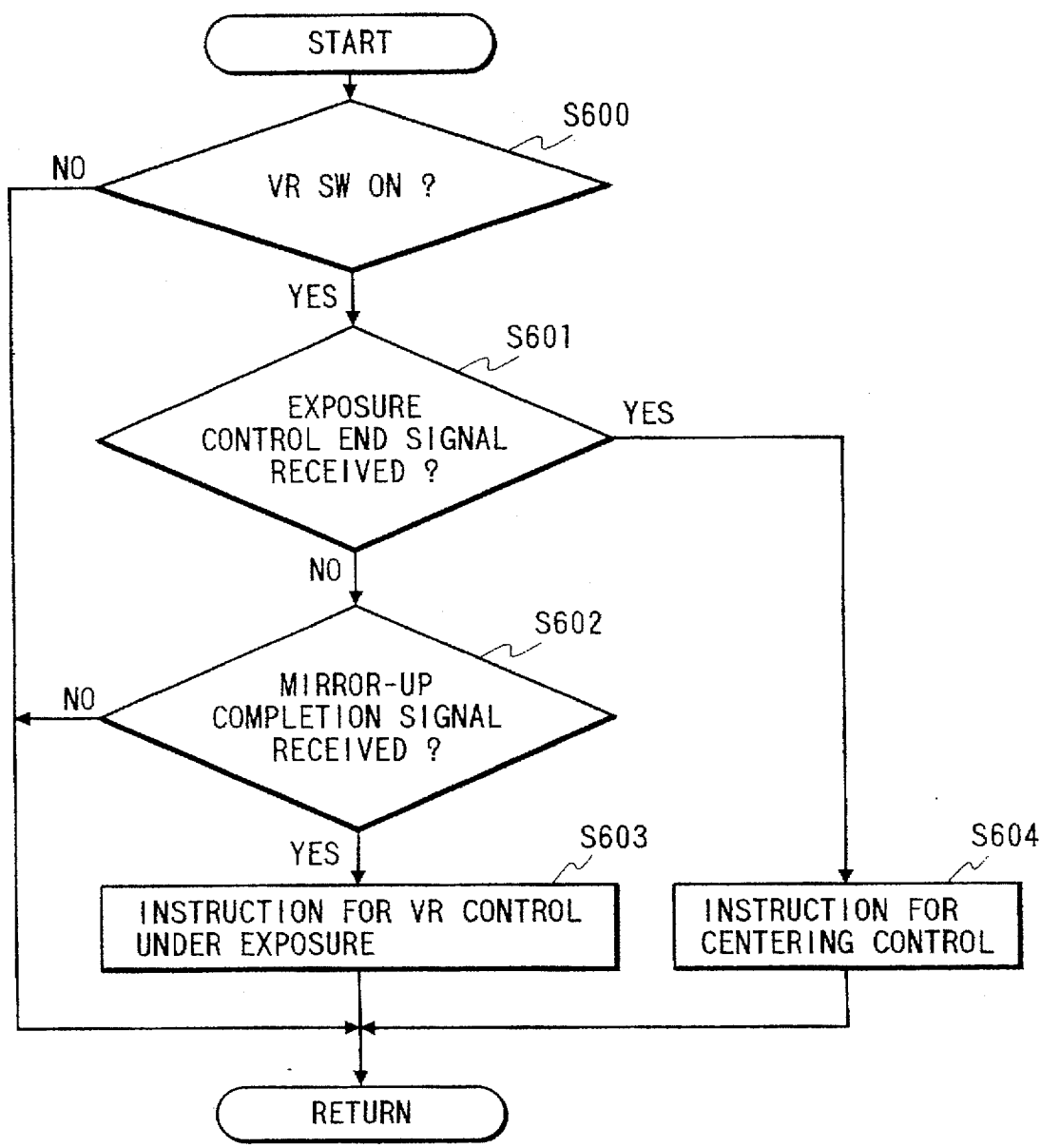
FIG. 6 is a flow chart for explaining the subroutine of step S206 according to the third embodiment of a vibration reduction device of the present invention.

FIG. 6 is a flow chart for explaining the third embodiment of the operation order of the subroutine executed in step S206 shown in FIG. 3.

In the third embodiment, the execution timing of vibration reduction control is determined on the basis of a mirror-up completion signal and an exposure control completion signal transmitted from the microcomputer 25 for a body in the body apparatus 2, and the vibration reduction control is executed only under film exposure.

First, the microcomputer 24 for a communication in the lens apparatus 1 checks the ON/OFF state of the VR switch 14 to determine if the vibration reduction control mode is ON (S600).

If the VR switch 14 is ON (vibration reduction control execution mode), the flow advances to step S601; otherwise (vibration reduction control non-execution mode), the flow returns to the main routine.

The microcomputer 24 for communication in the lens apparatus 1 then checks if an exposure control completion signal is received from the microcomputer 25 for a body in the body apparatus 2 (S601).

If an exposure control completion signal is received, the flow advances to step S604; otherwise, the flow advances to step S602.

The microcomputer 24 for a communication in the lens apparatus 1 checks if mirror-up completion signal is received from the microcomputer 25 for a body in the body apparatus 2 (S602).

If a mirror-up completion signal is received, the flow advances to step S603; otherwise, the flow returns to the main routine.

In step S603, the microcomputer 24 for communication in the lens apparatus 1 issues an instruction for vibration reduction control under exposure to the microcomputer 3 for vibration reduction control.

On the other hand, if an exposure control completion signal is received in step S601, the microcomputer 24 for communication in the lens apparatus 1 issues an instruction for centering control for moving the image vibration reduction optical system B to the optical central position to the microcomputer 3 for vibration reduction control (S604).

In the vibration reduction device of the third embodiment described above, since the execution timing of the vibration reduction control is determined on the basis of the mirror-up completion signal and the exposure control completion signal transmitted from the microcomputer 25 for a body in the body apparatus 2, even when the lens apparatus 1 having the image vibration reduction function is attached to the body apparatus 2 having no control function for the image vibration reduction function, the image vibration reduction control can be reliably performed.

Also, since the start of vibration reduction control under film exposure can be detected immediately before film exposure independently of the body type of the body apparatus 2, the start precision of the vibration reduction control can be improved, and no table look-up operation for determining the start timing is required.

The fourth and fifth embodiments as embodiments according to the second aspect of the present invention will be described below with reference to FIG. 7 and FIGS. 8A and 8B. Since the arrangement of the apparatus of these embodiments is the same as that in the first embodiment shown in FIGS. 1 and 2, and the main flow of the operation in the fourth embodiment is the same as that shown in FIG. 3, a detailed description thereof will be omitted.

FIG. 7 is a flow chart for explaining the fourth embodiment of the operation order of the subroutine executed in step S206 shown in FIG. 3.

In this subroutine, a case will be exemplified wherein the lens apparatus 1 is connected to the body apparatus 2 which cannot receive vibration detection state information from the lens apparatus 1.

Also, in this subroutine, the execution timing of vibration reduction control of the lens apparatus 1 is determined on the basis of the exposure control start signal and the exposure control completion signal as signals transmitted from the microcomputer 25 for a body in the body apparatus 2.

The lens apparatus 1 checks the ON/OFF state of the VR switch 14 to determine if the vibration reduction control mode is ON (S700).

If the VR switch 14 is ON (vibration reduction control execution mode), the flow advances to step S701; otherwise (vibration reduction control non-execution mode), the flow returns to the main routine.

Note that the relationship between the state of the VR switch 14 and the control operation is the same as that shown in Table 1 above associated with the first embodiment described above.

Subsequently, the microcomputer 24 for a communication in the lens apparatus 1 checks if an exposure control completion signal is received from the microcomputer 25 for a body in the body apparatus 2 (S701). If an exposure control completion signal is received, the flow advances to step S705; otherwise, the flow advances to step S702.

The microcomputer 24 for a communication in the lens apparatus 1 checks if an exposure control start signal is received from the microcomputer 25 for a body in the body apparatus 2 (S702). If an exposure control start signal is received, the flow advances to step S703; otherwise, the flow advances to step S706.

Table 5 below summarizes information associated with the timings of signals transmitted from the microcomputer 25 for a body in the body apparatus 2 to the microcomputer 24 for a communication in the lens apparatus 1.

TABLE 5

| Transmitted Information | Meaning |
| --- | --- |
| Exposure Control Start Signal | Signal synchronous with change in state of release switch operated by photographer at the beginning of film exposure. |

TABLE 5-continued

| Transmitted Information | Meaning |
| --- | --- |
| Exposure Control Completion Signal | Signal synchronous with completion of exposure control in body. |

In step S703, the microcomputer 24 for a communication in the lens apparatus 1 checks if the vibration reduction head amplifier 13 is in the vibration detection possible state. Note that the vibration detection possible state is the state wherein the vibration reduction head amplifier 13 has completed its detection preparation operation, and is operating normally. If the amplifier 13 is in the vibration detection possible state, the flow advances to step S704; otherwise, the flow returns to the main routine.

In step S704, the microcomputer 24 for a communication in the lens apparatus 1 issues an instruction for vibration reduction control under exposure to the microcomputer 3 for vibration reduction control. The instruction for vibration reduction control under exposure instructs a control method for performing precise control upon reduction of vibrations under actual exposure.

On the other hand, if the microcomputer 24 for communication in the lens apparatus 1 receives an exposure control completion signal in step S701, the flow advances to step S705.

It is then checked if the VR activation switch 27 is ON (S705).

If the VR activation switch 27 is ON, the flow advances to step S706; otherwise, the flow advances to step S708.

The relationship between the state of the VR activation switch 27 and the control operation is the same as that shown in Table 4 above associated with the first embodiment described above.

In step S706, the microcomputer 24 for communication in the lens apparatus 1 checks if the vibration reduction head amplifier 13 is in the vibration detection possible state.

If the amplifier 13 is in the vibration detection possible state, the flow advances to step S707; otherwise, the flow returns to the main routine.

In step S707, the microcomputer 24 for communication in the lens apparatus 1 issues an instruction for extra-exposure vibration reduction control as a control method different from vibration reduction control under exposure to the microcomputer 3 for vibration reduction control. The instruction for extra-exposure vibration reduction control instructs a mode of performing coarse control when vibrations of a finder image are to be reduced after an image taking preparation start operation.

On the other hand, if the VR activation switch 27 is OFF, the microcomputer 24 for communication in the lens apparatus 1 issues an instruction for stopping vibration reduction control to the microcomputer 3 for vibration reduction control (S708).

In the above-mentioned vibration reduction device, when an exposure control start signal is input from the microcomputer 25 for a body in the body apparatus 2 while the vibration reduction head amplifier 13 is not in the vibration detection possible state, an inhibition means (S703) arranged in the lens apparatus 1 can inhibit an instruction for vibration reduction control under exposure from being output. For this reason, image vibration reduction control can be easily and reliably prevented from being executed in a state wherein the amplifier 13 is not ready to detect vibrations.

Independently of the type of body apparatus 2 to which the lens apparatus 1 with the image vibration reduction function may be connected, image vibration reduction control can be inhibited in a state wherein the amplifier 13 is not in the vibration detection possible state. For this reason, the conventional problem in which "the image vibration amount of a picture taken when the image vibration reduction control is performed becomes larger than that of a picture taken when no image vibration reduction control is performed under the same condition contrary to the original purpose" can be reliably solved.

The vibration reduction device of the fourth embodiment described above uses an exposure control start signal which is input from the microcomputer 25 for a body in the body apparatus 2 and is synchronous with the image taking start operation of a photographer as vibration reduction start information that serves as information for determining the start timing of vibration reduction. However, the present invention is not limited to such an embodiment. For example, a signal which is input from the microcomputer 25 for a body in the body apparatus 2 and is synchronous with completion of the mirror-up operation in the body apparatus 2, or a signal used only for starting vibration reduction may be used.

Figure 8A:
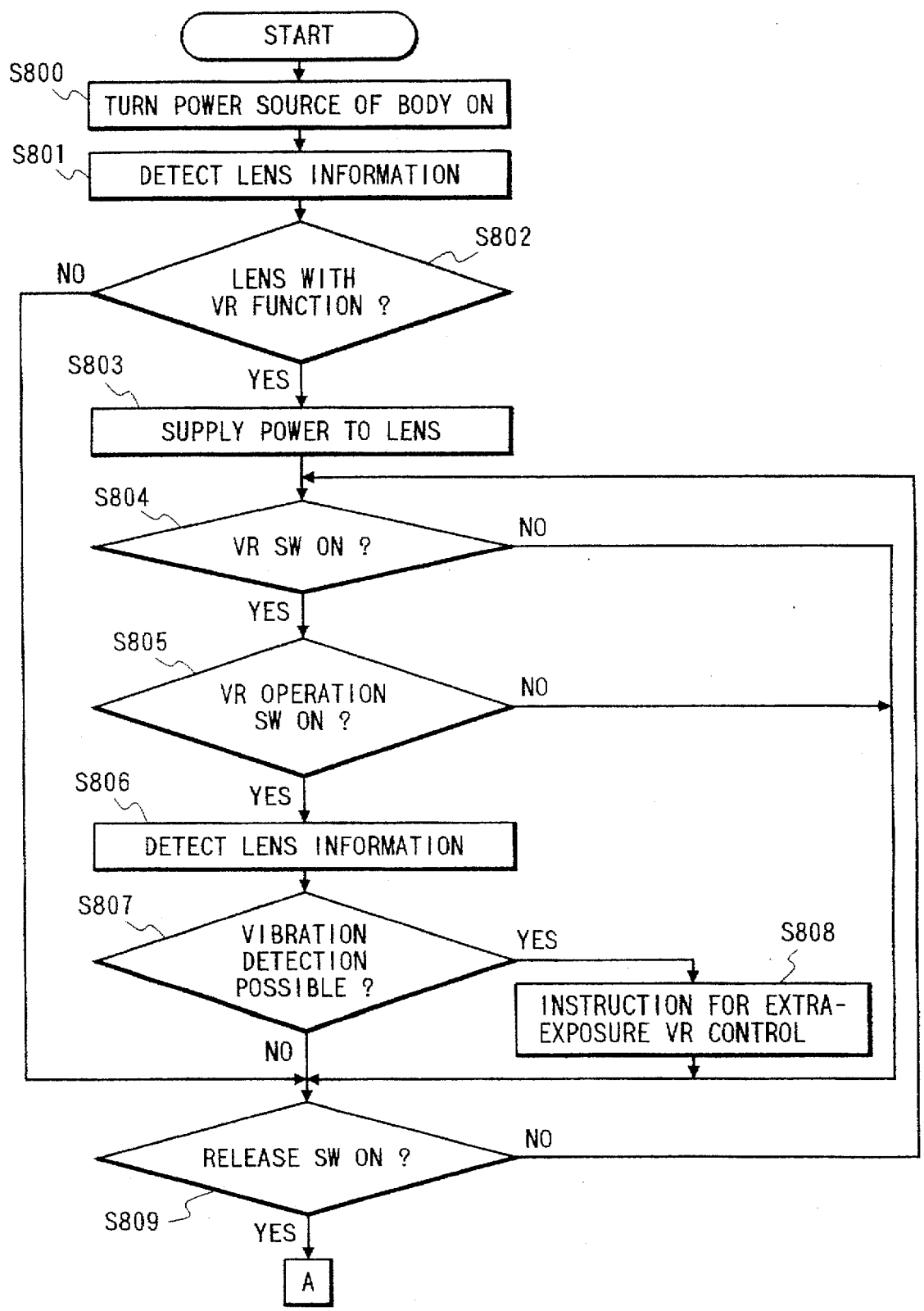
FIGS. 8A and 8B are flow charts for explaining the operation according to the fifth embodiment of a vibration reduction device of the present invention.
Figure 8B:
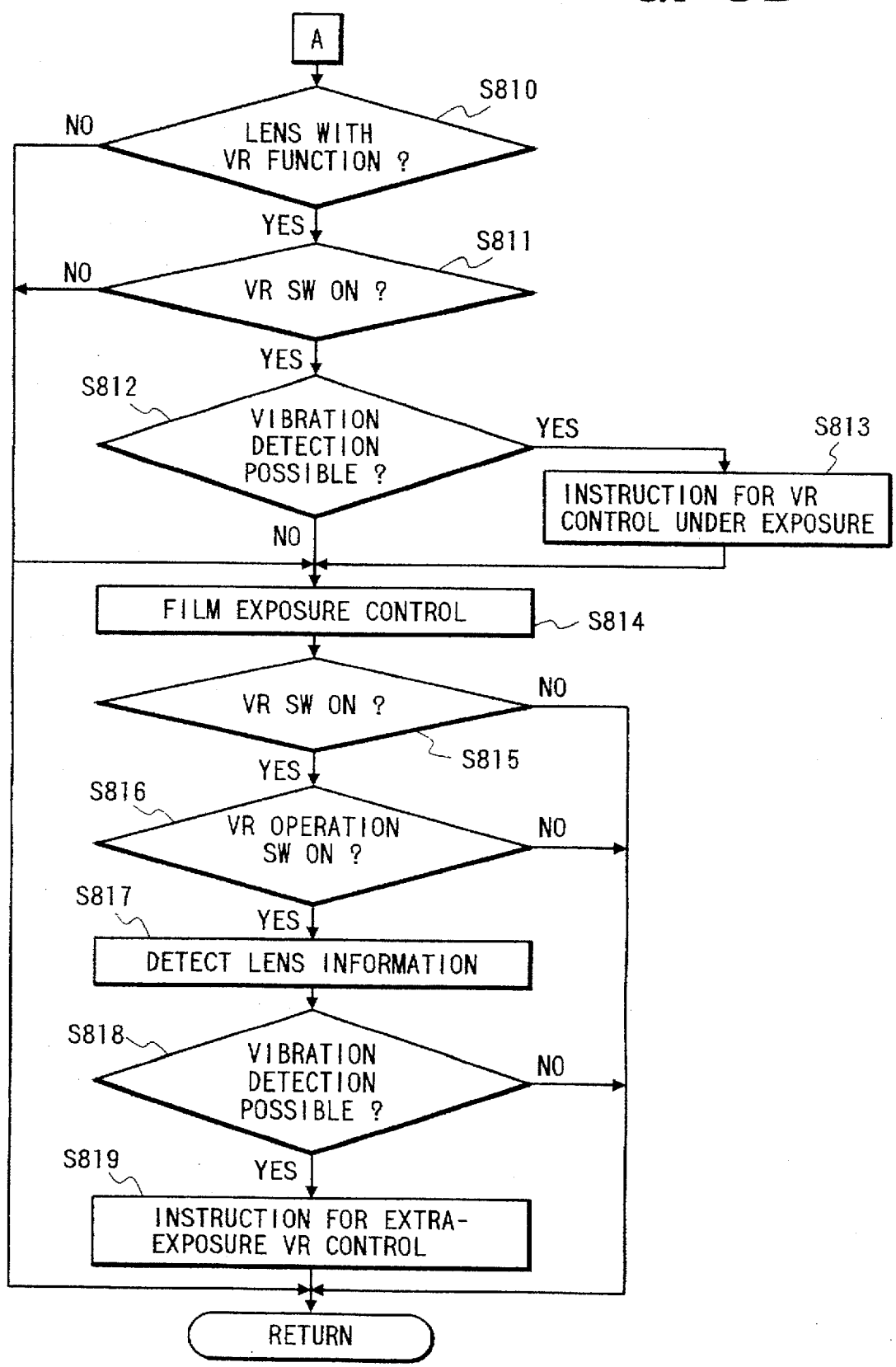

FIGS. 8A and 8B are flow charts for explaining the operation order of the microcomputer 25 for a body in the body apparatus 2 in the fifth embodiment of the vibration reduction device according to the present invention.

In this embodiment, the microcomputer 24 for communication in the lens apparatus 1 transmits information of the vibration detection state of the vibration reduction head amplifier 13 to the microcomputer 25 for a body in the body apparatus 2, and the microcomputer 25 for a body in the body apparatus 2 instructs vibration reduction control to the lens apparatus 1 on the basis of the received information.

The microcomputer 25 for a body in the body apparatus 2 starts a power supply circuit in the body apparatus 2 when the power switch of the body apparatus 2 is turned on (S800).

The microcomputer 25 for a body in the body apparatus 2 communicates with the microcomputer 24 for communication in the lens apparatus 1 via the lens contact 4 shown in FIG. 1 so as to detect lens information (S801).

The microcomputer 25 for a body in the body apparatus 2 checks based on the lens information obtained in step S801 if the lens apparatus 1 is a lens with a vibration reduction function (S802).

If the lens apparatus 1 is a lens with a vibration reduction function, the flow advances to step S803; otherwise, the flow jumps to step S809.

In step S803, the body apparatus 2 supplies a power supply voltage to the lens apparatus 1.

The microcomputer 25 for body in the body apparatus 2 checks the ON/OFF state of the VR switch 14 via the microcomputer 24 for a communication to determine if the vibration reduction control mode is ON (S804).

If the VR switch 14 is ON (vibration reduction control execution mode), the flow advances to step S805; otherwise (vibration reduction control non-execution mode), the flow jumps to step S809.

It is then checked if the VR activation switch 27 is ON (S805).

If the VR activation switch 27 is ON, the flow advances to step S806; otherwise, the flow jumps to step S809.

In step S806, the microcomputer 25 for a body in the body apparatus 2 communicates with the microcomputer 24 for communication in the lens apparatus 1 via the lens contact 4 shown in FIG. 1 so as to detect vibration detection state information as lens information.

The microcomputer 25 for a body in the body apparatus 2 checks based on the vibration detection state information if the vibration reduction head amplifier 13 is in the vibration detection possible state (S807).

Note that the vibration detection possible state is the state wherein the vibration reduction head amplifier 13 has completed its detection preparation operation, and is operating normally. More specifically, this state is detected by the microcomputer 3 for vibration reduction control, and is input to the microcomputer 24 for a communication.

If the amplifier 13 is in the vibration detection possible state, the flow advances to step S808; otherwise, the flow advances to step S809.

In step S808, the microcomputer 25 for a body in the body apparatus 2 transmits an instruction for extra-exposure vibration reduction control to the microcomputer 24 for a communication in the lens apparatus 1.

Subsequently, the microcomputer 25 for a body in the body apparatus 2 checks if the release switch that issues an exposure start command of the photographer is ON (S809).

If the release switch is ON, the flow advances to step S810; otherwise, the flow returns to step S804.

In step S810, the microcomputer 25 for a body in the body apparatus 2 checks based on the lens information obtained in step S801 if the lens apparatus 1 is a lens with a vibration reduction function.

If the lens apparatus 1 is a lens with a vibration reduction function, the flow advances to step S811; otherwise, the flow returns to the main routine.

In step S811, the body apparatus 2 checks the ON/OFF state of the VR switch 14 to determine if the vibration reduction control mode is ON.

If the VR switch 14 is ON (vibration reduction control execution mode), the flow advances to step S812; otherwise (vibration reduction control non-execution mode), the flow returns to the main routine.

The microcomputer 25 for a body in the body apparatus 2 checks if the vibration reduction head amplifier 13 is in the vibration detection possible state (S812).

If the amplifier 13 is in the vibration detection possible state, the flow advances to step S813; otherwise, the flow advances to step S814.

In step S813, the microcomputer 25 for a body in the body apparatus 2 transmits an instruction for vibration reduction control under exposure to the microcomputer 24 for communication in the lens apparatus.

Subsequently, the microcomputer 25 for a body in the body apparatus 2 executes film exposure control (S814).

Thereafter, the microcomputer 25 for a body in the body apparatus 2 checks the. ON/OFF state of the VR switch 14 to determine if the vibration reduction control mode is ON (S815).

If the VR switch 14 is ON (vibration reduction control execution mode), the flow advances to step S816; otherwise (vibration reduction control non-execution mode), the flow returns to the main routine.

It is then checked if the VR activation switch 27 is ON (S816).

If the VR activation switch 27 is ON, the flow advances to step S817; otherwise, the flow returns to the main routine.

In step S817, the microcomputer 25 for a body in the body apparatus 2 communicates with the microcomputer 24 for communication in the lens apparatus 1 via the lens contact 4 shown in FIG. 1 so as to detect vibration detection state information as lens information.

Subsequently, the microcomputer 25 for a body in the body apparatus 2 checks if the vibration reduction head amplifier 13 is in the vibration detection possible state (S818).

If the amplifier 13 is in the vibration detection possible state, the flow advances to step S819; otherwise, the flow returns to the main routine.

The microcomputer 25 for a body in the body apparatus 2 transmits an instruction for extra-exposure vibration reduction control to the microcomputer 24 for communication in the lens apparatus 1 (S819).

In the above-mentioned vibration reduction device, when an image taking start instruction is input while the vibration reduction head amplifier 13 is not in the vibration detection possible state, an inhibition means (S812) arranged in the body apparatus 2 can inhibit an instruction signal for vibration reduction control under exposure from being transmitted to the lens apparatus 1. Therefore, image vibration reduction control in the vibration detection impossible state can be easily and reliably prevented.

In the above-mentioned vibration reduction device, independently of the type of lens apparatus 1 with the image vibration reduction function which is connected to the body apparatus 2, the image vibration reduction control in the vibration detection impossible state can be prevented. Therefore, the conventional problem in which the image vibration amount of a picture taken when the image vibration reduction control is performed becomes larger than that of a picture taken when no image vibration reduction control is performed under the same condition contrary to the original purpose can be reliably solved.

In the vibration reduction device of the fifth embodiment described above, the microcomputer 25 for a body in the body apparatus 2 outputs an instruction signal for vibration reduction control under exposure, which is used only for starting vibration reduction, to the lens apparatus 1 as vibration reduction start information that serves as information for determining the start timing of image vibration reduction. However, the present invention is not limited to such an embodiment. For example, as vibration reduction start information, an exposure control start signal as a signal synchronous with the image taking start operation by a photographer, or a signal synchronous with completion of the mirror-up operation in the body apparatus 2 may be used.

The present invention is not limited to the above embodiments. For example, when an image taking start instruction is issued within a predetermined period of time after the power supply voltage is supplied from the body apparatus 2 to the lens apparatus 1, the inhibition means arranged in the body apparatus 2 may inhibit vibration reduction start information from being transmitted to the lens apparatus 1 or may suspend transmission until a predetermined period of time elapses. In this case as well, image vibration reduction control in the vibration detection impossible state can be easily and reliably prevented.

In this case, the predetermined period of time is preferably set to be a maximum time until the vibration reduction head amplifier 13 is set in the vibration detection possible state after the power supply circuit is started.

In this case, as the vibration reduction start information, a signal synchronous with the image taking start operation of a photographer, a signal synchronous with completion of the mirror-up operation in the body apparatus 2, or a vibration reduction start command used only for starting image vibration reduction may be used.

As described above, in the vibration reduction apparatus of the present invention, when an image taking start instruction is issued in the vibration detection impossible state, the inhibition means arranged in the body apparatus inhibits vibration reduction start information from being transmitted to the lens apparatus or suspends transmission until a vibration detection means is set in the vibration detection possible state. Therefore, image vibration reduction control in the vibration detection impossible state can be easily and reliably prevented.

When vibration reduction start information is input in the vibration detection impossible state, the inhibition means arranged in the lens apparatus inhibits image vibration reduction from being executed, or suspends execution until a vibration detection means is set in the vibration detection possible state. Therefore, image vibration reduction control in the vibration detection impossible state can be easily and reliably prevented.

When an image taking start instruction is issued within a predetermined period of time after a power supply voltage is supplied from the body apparatus to the lens apparatus, the inhibition means arranged in the body apparatus inhibits vibration reduction start information from being transmitted to the lens apparatus or suspends transmission until the predetermined period of time elapses. Therefore, image vibration reduction control in the vibration detection impossible state can be easily and reliably prevented.

What is claimed is:

1. A vibration reduction device applied to a system including a body apparatus which has an image taking function and a lens apparatus which is detachably mounted on said body apparatus and includes an image taking optical system, comprising:

a vibration detector to detect a vibration generated in said body apparatus or said lens apparatus;

an image vibration reduction optical system constituting a portion of said image taking optical system and adapted to reduce an image vibration generated by the vibration;

a driving device to move some or all components of said image vibration reduction optical system relative to a surface on which the image is to be formed; and an image vibration reduction controller to generate an image vibration reduction signal to control said driving device on the basis of an output from said vibration detector, wherein said driving device starts image vibration reduction control a predetermined period of time after said driving device receives a signal synchronous with a start of an image taking sequence from said body apparatus.

2. A device according to claim 1, wherein the predetermined period of time is determined based on body identification information which is transmitted from said body apparatus.

3. A device according to claim 1, wherein the predetermined period of time is a constant time including zero time.

4. A device according to claim 1, wherein said body apparatus is a single-lens reflex camera body, and the predetermined period of time corresponds to a shortest one of mirror-up times of a plurality of single-lens reflex camera bodies to which said lens apparatus can be mounted.

5. A vibration reduction device applied to a system including a body apparatus which has an image taking function and a lens apparatus which is detachably mounted on said body apparatus and includes an image taking optical system, comprising:

a vibration detector to detect a vibration generated in said body apparatus or said lens apparatus;

an image vibration reduction optical system constituting a portion of said image taking optical system and adapted to reduce an image vibration generated by the vibration;

a driving device to move some or all components of said image vibration reduction optical system relative to a surface of which the image is to be formed; and an image vibration reduction controller to generate an image vibration reduction signal to control said driving device on the basis of an output from said vibration detector, wherein said driving device stops image vibration reduction control after said driving device receives a signal synchronous with completion of an image taking sequence from said body apparatus.

6. A vibration reduction device applied to a system including a body apparatus which has an image taking function and a lens apparatus which is detachably mounted on said body apparatus and includes an image taking optical system, comprising:

a vibration detector to detect a vibration generated in said body apparatus or said lens apparatus, an image vibration reduction optical system constituting a portion of said image taking optical system and adapted to reduce an image vibration generated by the vibration;

a driving device to move some of all components of said image vibration reduction optical system relative to a surface on which the image is to be formed; and an image vibration reduction controller to generate an image vibration reduction signal to control said driving device on the basis of an output from said vibration detector, wherein said driving device moves said image vibration reduction optical system to an optical central position after said driving device receives a signal synchronous with completion of an image taking sequence from said body apparatus.

7. A vibration reduction device applied to a system including a body apparatus which has an image taking function and a lens apparatus which is detachably mounted on said body apparatus and includes an image taking optical system, comprising:

a vibration detector to detect a vibration generated in said body apparatus or said lens apparatus;

an image vibration reduction optical system constituting a portion of said image taking optical system and adapted to reduce an image vibration generated by the vibration;

a driving device to move some or all components of said image vibration reduction optical system relative to a surface on which the image is to be formed;

an image vibration reduction controller to generate an image vibration reduction signal to control said driving device on the basis of an output from said vibration detector; and an exposure control time reception unit, arranged in said lens apparatus, to receive information associated with an exposure control time from said body apparatus.

wherein said driving device determines completion of exposure control on the basis of the exposure control time, and stops image vibration reduction control.

8. A vibration reduction device applied to a system including a body apparatus which has an image taking function and a lens apparatus which is detachably mounted on said body apparatus and includes an image taking optical system, comprising:

a vibration detector to detect a vibration generated in said body apparatus or said lens apparatus;

an image vibration reduction optical system constituting a portion of said image taking optical system and adapted to reduce an image vibration generated by the vibration;

a driving device to move some or all components of said image vibration reduction optical system relative to a surface on which the image is to be formed;

an image vibration reduction controller to generate an image vibration reduction signal to control said driving device on the basis of an output from said vibration detector; and an exposure control time reception unit, arranged in said lens apparatus, to receive information associated with an exposure control time from said body apparatus, wherein said driving device determines completion of exposure control on the basis of the exposure control time, and moves said image vibration reduction optical system to an optical central position.

9. A vibration reduction device applied to a system including a body apparatus which has an image taking function and a lens apparatus which is detachably mounted on said body apparatus and includes an image taking optical system, comprising:

a vibration detector to detect a vibration generated in said body apparatus or said lens apparatus;

an image vibration reduction optical system constituting a portion of said image taking optical system and adapted to reduce an image vibration generated by the vibration;

a driving device to move some or all components of said image vibration reduction optical system relative to a surface on which the image is to be formed; and an image vibration reduction controller to generate an image vibration reduction signal to control said driving device on the basis of an output from said vibration detector, wherein said driving device changes a control method of the image vibration reduction control after said driving device receives a signal synchronous with completion of an image taking sequence from said body apparatus.

10. A vibration reduction device applied to a system including a body apparatus which has an image taking function and a lens apparatus which is detachably mounted on said body apparatus and includes an image taking optical system, comprising:

a vibration detector to detect a vibration generated in said body apparatus or said lens apparatus;

an image vibration reduction optical system constituting a portion of said image taking optical system and adapted to reduce an image vibration generated by the vibration;

a driving device to move some or all components of said image vibration reduction optical system relative to a surface on which the image is to be formed;

an image vibration reduction controller to generate an image vibration reduction signal to control said driving device on the basis of an output from said vibration detector; and an exposure control time reception unit, arranged in said lens apparatus, to receive information associated with an exposure control time from said body apparatus, wherein said driving device determines completion of exposure control on the basis of the exposure control time, and changes a control method of the image vibration reduction control.

11. A vibration reduction device applied to a system including a body apparatus which has an image taking function and a lens apparatus which is detachably mounted on said body apparatus and includes an image taking optical system, comprising:

a vibration detector to detect a vibration generated in said body apparatus or said lens apparatus;

an image vibration reduction optical system constituting a portion of said image taking optical system and adapted to reduce an image vibration generated by the vibration;

a driving device to move some or all components of said image vibration reduction optical system relative to a surface on which the image is to be formed; and an image vibration reduction controller to generate an image vibration reduction signal to control said driving device on the basis of an output from said vibration detector, wherein said driving device changes a control method of the image vibration reduction control a predetermined period of time after said driving device receives a signal synchronous with start of an image taking sequence from said body apparatus.

12. A device according to claim 11, wherein the predetermined period of time is determined based on body identification information which is transmitted from said body apparatus.

13. A device according to claim 11, wherein the predetermined period of time is a constant time including zero time.

14. A device according to claim 11, wherein said body apparatus is a single-lens reflex camera body, and the predetermined period of time corresponds to a shortest one of mirror-up times of a plurality of single-lens reflex camera bodies to which said lens apparatus can be mounted.

15. A vibration reduction device applied to a system including a body apparatus which has an image taking function and a lens apparatus which is detachably mounted on said body apparatus and includes an image taking optical system, comprising:

a vibration detector to detect a vibration generating in said body apparatus or said lens apparatus;

an image vibration reduction optical system constituting a portion of said image taking optical system and adapted to reduce an image vibration generated by the vibration;

a driving device to move some or all components of said image vibration reduction optical system relative to a surface on which the image is to be formed;

an image vibration reduction controller to generate an image vibration reduction signal to control said driving device on the basis of an output from said vibration detector;

a transmission device to transmit, from said lens apparatus to said body apparatus, information indicating that said vibration detector is in a vibration detection possible state;

an output device, arranged in said body apparatus, to output, to said lens apparatus, information vibration reduction start information as information to determine a start timing of a driving operation of said driving device; and an inhibition unit, arranged in said body apparatus, when an image taking sequence is started while said vibration detector is not in a vibration detection possible state, to suspend transmission of the vibration reduction start information to said lens apparatus until said vibration detector is set in a vibration detection possible state.

16. A device according to claim 15, wherein the vibration reduction start information is a signal synchronous with an image taking start operation by a photographer.

17. A device according to claim 15, wherein said body apparatus comprises a single-lens reflex camera body, and the vibration reduction start information is a signal synchronous with completion of a mirror-up operation in said single-lens reflex camera body.

18. A device according to claim 15, wherein the vibration reduction start information is a vibration reduction start command used only for starting a driving operation of said driving device.

19. A vibration reduction device applied to a system including a body apparatus which has an image taking function and a lens apparatus which is detachably mounted on said body apparatus and includes an image taking optical system, comprising:

a vibration detector to detect a vibration generated in said body apparatus or said lens apparatus;

an image vibration reduction optical system constituting a portion of said image taking optical system and adapted to reduce an image vibration generated by the vibration;

a driving device to move some or all components of said image vibration reduction optical system relative to a surface on which the image is to be formed;

an image vibration reduction controller to generate an image vibration reduction signal to control said driving device on the basis of an output from said vibration detector;

a transmission device to transmit, from said lens apparatus to said body apparatus, information indicating that said vibration detector is in a vibration detection possible state;

an output device, arranged in said body apparatus, to output, to said lens apparatus, information vibration reduction start information as information to determine a start timing of a driving operation of said driving device; and an inhibition unit, arranged in said lens apparatus, when an image taking sequence is started while said vibration detector is not in a vibration detection possible state, to suspend transmission of the vibration reduction start information to said lens apparatus until said vibration detector is set in a vibration detection possible state.

20. A device according to claim 19, wherein the vibration reduction start information is a signal. synchronous with an image taking start operation by a photographer.

21. A device according to claim 19, wherein said body apparatus comprises a single-lens reflex camera body, and the vibration reduction start information is a signal synchronous with completion of a mirror-up operation in said single-lens reflex camera body.

22. A device according to claim 19, wherein the vibration reduction start information is a vibration reduction start command used only for starting a driving operation of said driving device.

23. A vibration reduction device applied to a system including a body apparatus which has an image taking function and a lens apparatus which is detachably mounted on said body apparatus and includes an image taking optical system, comprising:

a vibration detector to detect a vibration generated in said body apparatus or said lens apparatus;

an image vibration reduction optical system constituting a portion of said image taking optical system and adapted to reduce an image vibration generated by the vibration;

a driving device to move some or all components of said image vibration reduction optical system relative to a surface on which the image is to be formed;

an image vibration reduction controller to generate an image vibration reduction signal for controlling said driving device on the basis of an output from said vibration detector;

a transmission device to transmit, from said lens apparatus to said body apparatus, information indicating that said vibration detector is in a vibration detection possible state;

an output device, arranged in said body apparatus to output, to said lens apparatus, information vibration reduction start information as information to determine a start timing of a driving operation of said driving device; and an inhibition unit, arranged in said body apparatus, when an image taking start instruction is input within a predetermined period of time after electric power is supplied from said body apparatus to said lens apparatus, to inhibit transmission of the vibration reduction start information to said lens apparatus or suspending transmission until an elapse of the predetermined period of time.

24. A device according to claim 23, wherein the predetermined period of time is a maximum time required until said vibration detector is set in a vibration detection possible state.

25. A device according to claim 23, wherein the vibration reduction start information is a signal synchronous with an image taking start operation by a photographer.

26. A device according to claim 23, wherein said body apparatus comprises a single-lens reflex camera body, and the vibration reduction start information is a signal synchronous with completion of a mirror-up operation in said single-lens reflex camera body.

27. A device according to claim 23, wherein the vibration reduction start information is a vibration reduction start command used only for starting a driving operation of said driving device.

* * * * *

UNITED STATES PATENT AND TRADEMARK OFFICE
CERTIFICATE OF CORRECTION

PATENT NO. : 5,740,472
DATED : April 14, 1998
INVENTOR(S) : Shinichi Hirano

It is certified that error appears in the above-indentified patent and that said Letters Patent is hereby corrected as shown below:

Title Page: [30] Foreign Application Priority Data, change
"Sep. 19, 1995 [JP] Japan ................................... 7-236971" to
-- Sep. 14, 1995 [JP] Japan ................................... 7-236971--.

Signed and Sealed this

Fourth Day of August, 1998

Attest:

BRUCE LEHMAN

Attesting Officer          Commissioner of Patents and Trademarks